United States Patent
Pledger

[11] 3,970,373
[45] July 20, 1976

[54] MIRROR STEERING SYSTEM

[75] Inventor: Richard Payne Pledger, Fort Worth, Tex.

[73] Assignee: The United States of America as represented by the Secretary of the Air Force, Washington, D.C.

[22] Filed: Feb. 6, 1975

[21] Appl. No.: 547,855

[52] U.S. Cl. ............................... 350/285; 350/6
[51] Int. Cl.² ........................................ G02B 27/17
[58] Field of Search ............ 350/6, 7, 285; 178/7.6

[56] References Cited
UNITED STATES PATENTS
3,614,233  10/1971  Aslund .......................... 350/285 X Primary Examiner—John K. Corbin
Assistant Examiner—F. L. Evans
Attorney, Agent, or Firm—Joseph E. Rusz; Henry S. Miller

[57] ABSTRACT

A mechanical mirror steering system utilizing a combination of links and bearings connected as shown in the figure to form a rhombic parallelogram, and having a mirror so attached as to describe circular arc on a plane in a precise manner.

1 Claim, 2 Drawing Figures

MIRROR STEERING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the steering of mirrors. More particularly the invention relates to a mechanical device which has been especially adapted to reflect and direct an image, beam or light ray with a mirror to describe a circular arc on a plane in a precise manner, or reflect and direct an image beam, or light ray with two mirrors to a point in space from a radial direction in a precise manner.

Heretofore and up to the present time, the steering of a mirror to reflect and direct an image, beam or light ray has involved manually or mechanically positioning the mirror in a manner such that the mirror reflects the image, beam or light ray according to the law of mirror reflection, viz.: the angle of incidence is equal to the angle of reflection. Accordingly, the angle between the incident and reflected beams is twice the angle of incidence, and the normal line to the plane of the mirror bisects this angle. The task of precisely directing a reflected beam involves positioning the mirror such that the normal to the mirror bisects the subtended angle between the source of the beam and the desired position of the beam.

Several disadvantages are inherent in the task of positioning a mirror to direct a reflected beam to a target. If done manually, the beam must be present, and the beam must be directed to the target by trial and error. If done mechanically, the subtended angle between the source and the target must be measured; the spatial position of the beam source and the target must be determined. The mirror must then be positioned so that the normal lies in the plane of the source and target, the normal must precisely bisect the angle subtended by the source and the target.

SUMMARY OF THE INVENTION

The invention is an improvement over the prior art by providing a means to direct, steer, or aim a beam, light ray or image without having the beam, light ray or image present. The invention is characterized by a mirror, a steering rod, and a rhombic parallelogram linkage for achieving the aforesaid goals without the necessity of trial and error, estimating, measuring or calculating positions and angles.

By utilizing the distinctive linkage it is possible, to align the mirror such that the beam axis or expected beam axis is in coincidence with the appropriate axis of the parallelogram thereby assuring the proper redirection of the beam.

It is therefore an object of the invention to provide a new and improved mirror steering system.

It is another object of the invention to provide a mirror steering system that will direct, steer, or aim a beam, light ray, or image in a precise manner by means of a rhombic parallelogram linkage.

It is a further object of the invention to direct, steer, or aim a beam, light ray, or image without having the beam, light ray, or image present.

It is still another object of the invention to direct, steer, or aim a beam, light ray, or image without taking measurements.

It is still a further object of the invention to direct, steer, or aim a beam, light ray, or image without making calculations.

Other and further features and objects of the invention will be more apparent to those skilled in the art upon a consideration of the appended drawings and the following description wherein one constructional form of the apparatus for carrying out the invention is disclosed.

DESCRIPTION OF THE PREFERRED EMBODIMENT

Figure 2:
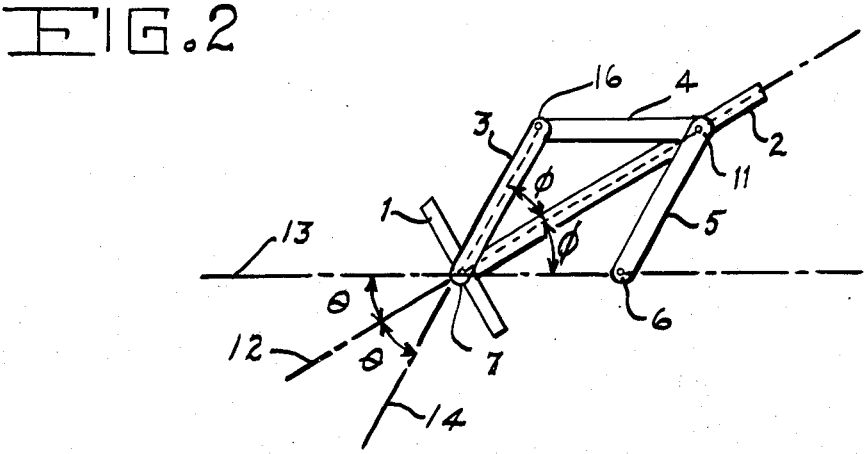
FIG. 2 is a side view of the device illustrating the geometry of the parallelogram linkage.
Figure 1:
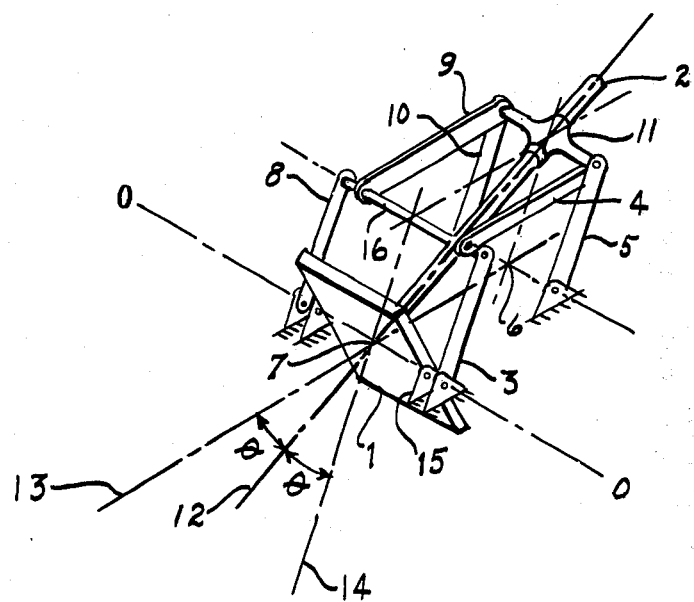
FIG. 1 is an isometric view of the device having a mirror a steering rod and parallelogram linkage.

Referring now to FIGS. 1 and 2, a mirror 1 is pivoted about axis 0—0 on trunnion bearings 15. Connected to the mirror 1 and forming a normal to the mirror is rod 2. Links 3, 4, and 5, along with fixed length from point 6 to point 7 form a rhombic parallelogram 6, 7, 16, 11, with point 7 lying on axis 0—0. Axis 7–16 lies in the plane of links 3 and 8. The rod 2 passes through a slider bearing 11. Bearing 11 is located at the vertex of the parallelogram opposite the vertex 7.

Rod 2 is a diagonal in the parallelogram. Rod 2 bisects the angle formed by side 6–7 and side 7–16 of the parallelogram; the parallelogram angle formed by sides 6–11 and 11–16 is also bisected by Rod 2.

A central ray 13 of a beam forms angle $\theta$ with mirror normal 12 and is reflected by mirror 1. The reflected ray 14 forms angle $\theta$ with normal 12. Normal 12 is the angle bisector of the angle $2\theta$ between 13 and 14.

If ray 13 is coincident with axis 6–7, angle $\theta$ will be equal to angle $\phi$ between axis 6–7 and rod 2. Likewise angle $\theta$ between reflected ray 14 and normal 12 will be equal to angle $\phi$ between axis 7–6 and rod 2. Ray 14 is then coincident with axis 7–16. The relationship of each corresponding angle remains true for all possible angles of reflection. Axis 6–7 is the analog of normal 12, all on the reverse side of mirror 1.

In the constructional form illustrated in FIG. 1, a beam may be directed to the desired target by positioning the device such that axis 6–7 is coincident with the beam axis, and the axis 7–16 is coincident with the axis to the target. The directing of the beam is strictly a mechanical function independent of the presence of such beam and may be accomplished by boresighting, mechanical connection, or similar means, along the particular axis.

The device may be utilized to direct a beam from a variable source to a fixed target by positioning the device such that axis 6–7 is coincident with the axis to the target, and positioning axis 7–16 to be coincident with the axis of the beam.

The device may be utilized to direct a beam from a variable source to a variable target by maintaining particular axis alignment.

Although only the preferred embodiment of devices for carrying out the invention have been described above, it is not to be construed that my invention is limited to such embodiments. Other modifications may be made by those skilled in the art without departing from the spirit and scope of the invention defined below.

I claim:

1. A mechanical mirror steering system comprising: a base; a first pair of trunnion bearings mounted on the base; a mirror pivotally mounted about an axis passing through said first trunnion bearings; steering rod means connected to the mirror for moving the mirror and extending in a direction normal thereto, along an axis intersecting the first trunnion axis; a second pair of trunnion bearings mounted on the base in a spaced parallel relationship to said first trunnion bearings; a first and second pair of links, pivotally attached to said first and second trunnion bearings, for movement in parallel planes; a third pair of links each pivotally connecting a first and second link in a common plane whereby said links and base form a pair of rhombic parallelograms in separate parallel planes; a first means for connecting the links in the parallel planes at a pivot point; a second means for connecting the parallel planes at a pivot point including, a slider bearing adapted to receive said steering rod means and thereby cause the mirror to move only within the range allowed by the pivotally connected links.

* * * * *